(12) United States Patent
Wang (10) Patent No.: US 9,949,266 B2
(45) Date of Patent: Apr. 17, 2018

(54) POWER CONTROL METHOD AND APPARATUS

(71) Applicant: HUAWEI TECHNOLOGIES CO., LTD, Shenzhen (CN)

(72) Inventor: Fan Wang, Stockholm (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 82 days.

(21) Appl. No.: 14/850,045

(22) Filed: Sep. 10, 2015

(65) Prior Publication Data

US 2015/0382358 A1    Dec. 31, 2015

Related U.S. Application Data

(63) Continuation of application No. PCT/CN2013/072465, filed on Mar. 12, 2013.

(51) Int. Cl.
*G01R 31/08* (2006.01)
*H04W 72/04* (2009.01)
(Continued)

(52) U.S. Cl.
CPC ....... *H04W 72/0473* (2013.01); *H04L 1/1861* (2013.01); *H04W 52/16* (2013.01);
(Continued)

(58) Field of Classification Search
CPC ........... H04W 72/0473; H04W 52/325; H04W 52/16; H04W 52/346; H04W 72/0406; H04L 1/1861
See application file for complete search history.

(56) References Cited

U.S. PATENT DOCUMENTS 9,042,357 B2 *  5/2015  Seo ............... H04L 1/1861
                                                370/203
9,144,037 B2 *  9/2015  Seong ............ H04L 1/0069
(Continued)

FOREIGN PATENT DOCUMENTS

CN         1697341        11/2005
CN         1983849         6/2007
(Continued)

OTHER PUBLICATIONS

Extended European Search Report dated Feb. 11, 2016 corresponding to 13877517.6.
(Continued)

*Primary Examiner* — Robert Wilson
(74) *Attorney, Agent, or Firm* — Staas & Halsey LLP (57) ABSTRACT

Embodiments of the present invention disclose a power control method and apparatus, and relate to the field of communications technologies. The method includes: determining, according to a power offset parameter configured by a network side, a first power offset value used by a control channel corresponding to a first subframe, and determining a second power offset value used by a control channel corresponding to a second subframe; feeding back the control channel corresponding to the first subframe to the network side by using the first power offset value; and feeding back the control channel corresponding to the second subframe to the network side by using the second power offset value. The present invention is applicable to a multi-flow transmission scenario in which a UE feeds back control information to a network side.

9 Claims, 5 Drawing Sheets

(51) Int. Cl.
*H04L 1/18* (2006.01)
*H04W 52/34* (2009.01)
*H04W 52/16* (2009.01)
*H04W 52/32* (2009.01)

(52) U.S. Cl.
CPC ....... *H04W 52/325* (2013.01); *H04W 52/346* (2013.01); *H04W 72/0406* (2013.01)

(56) References Cited

U.S. PATENT DOCUMENTS

| | | | |
|---|---|---|---|
| 9,331,832 B2* | 5/2016 | Lindbom | H04L 5/005 |
| 2003/0174676 A1* | 9/2003 | Willenegger | H04B 7/022 |
| | | | 370/335 |
| 2004/0009767 A1* | 1/2004 | Lee | H04L 1/0025 |
| | | | 455/422.1 |
| 2007/0106922 A1* | 5/2007 | Obuchi | H04L 1/0001 |
| | | | 714/704 |
| 2009/0196192 A1* | 8/2009 | Lim | H04W 52/247 |
| | | | 370/252 |
| 2012/0176947 A1 | 7/2012 | Xi et al. | |
| 2012/0257568 A1* | 10/2012 | Cai | H04L 1/1614 |
| | | | 370/328 |
| 2013/0114425 A1* | 5/2013 | Sayana | H04B 7/024 |
| | | | 370/252 |
| 2014/0079020 A1* | 3/2014 | Caverni | H04B 17/327 |
| | | | 370/331 |
| 2014/0086166 A1* | 3/2014 | Lindbom | H04W 52/16 |
| | | | 370/329 |
| 2014/0098746 A1* | 4/2014 | Luo | H04W 28/048 |
| | | | 370/328 |
| 2015/0207607 A1 | 7/2015 | Tang et al. | |
| 2015/0382358 A1* | 12/2015 | Wang | H04L 1/1861 |
| | | | 370/329 |

FOREIGN PATENT DOCUMENTS

| | | |
|---|---|---|
| CN | 103181108 A | 6/2013 |
| WO | 2011/100646 A1 | 8/2011 |
| WO | WO2011105806 | 9/2011 |
| WO | 2012/044988 A1 | 4/2012 |
| WO | WO2012/154094 * | 11/2012 |
| WO | WO2012154094 | 11/2012 |

OTHER PUBLICATIONS

International Search Report dated Dec. 19, 2013 in corresponding International Application No. PCT/CN2013/072465.
*HS-DPCCH quality for MF-HSDPA transmissions*; 3GPP TSG RAN WG1 Meeting #68, R1-120339, Dresden, Germany, Feb. 6-10, 2012 (7 pp.).
International Search Report, dated Dec. 19, 2013, in corresponding International Application No. PCT/CN2013/072465 (10 pp.).
Office Action, dated Jul. 4, 2017, in Chinese Application No. 201380000235.4.

* cited by examiner

POWER CONTROL METHOD AND APPARATUS

CROSS-REFERENCE TO RELATED APPLICATIONS

This application is a continuation of International Application No. PCT/CN2013/072465 filed on Mar. 12, 2013, which is hereby incorporated by reference in the entirety.

TECHNICAL FIELD

The present invention relates to the field of communications technologies, and in particular, to a power control method and apparatus.

BACKGROUND

In Release R11 (Release 11, Release 11) of WCDMA (Wideband Code Division Multiple Access) of 3GPP (3rd Generation Partnership Project), multiflow transmission (Multi-Flow Transmission, MF-Tx for short in English) is supported, that is, multiple cells are allowed to simultaneously send HSDPA (High Speed Downlink Packet Access, High Speed Downlink Packet Access) data to a UE (user equipment), so as to improve edge UE throughput performance and cell downlink throughput performance. Correspondingly, the UE separately feeds back an ACK (acknowledgement) and/or a CQI (channel quality indicator) to each cell. Further, in an SF-DC (Single-Frequency Dual-Cell) scenario, the UE may feed back an HS-DPCCH (High speed dedicated physical control channel) to each cell in a joint feedback manner.

The foregoing SF-DC is introduced to a HetNet (heterogeneous network). The HetNet is formed by a macro network and a micro network, the micro network is within coverage of the macro network, and a corresponding macro cell and micro cell may simultaneously send data to a UE located in the micro cell. To avoid causing interference to the other cell when the macro cell and the micro cell simultaneously send data to the UE, the macro cell may configure some downlink subframes as ABS (almost blank subframe) subframes. In this way, a downlink power of an ABS subframe is lower than that of another subframe; therefore, when performing, in a subframe that is within same time as the ABS subframe, downlink scheduling on a UE, the micro cell receives relatively small interference. After the SF-DC is introduced, the UE feeds back an HS-DPCCH to a macro base station and a micro base station by means of joint feedback, and the macro base station and the micro base station need to independently parse the HS-DPCCH to obtain feedback information that may be provided for a base station to perform downlink scheduling.

In the foregoing scenario in which the SF-DC is applied to the HetNet, the UE is relatively close to the micro base station but relatively far from the macro base station; therefore, when the UE feeds back the HS-DPCCH, quality of a signal received by the macro base station is weaker than that received by the micro base station, thereby causing imbalance in an uplink link. To improve this situation, a power offset range of the HS-DPCCH may be increased, so that the macro base station also obtains an HS-DPCCH with better signal quality.

In the prior art, at least a following problem exists: for an ABS subframe, an HS-DPCCH corresponding to the ABS subframe is almost of no help to a macro base station; however, a power offset setting of the ABS subframe is the same as that of a non-ABS subframe. Due to a relatively large power offset of the ABS subframe, more power is consumed when a UE feeds back the HS-DPCCH corresponding to the ABS subframe, and an HS-DPCCH with a large power offset causes larger interference to uplink communication signals of both a micro cell and a macro cell.

SUMMARY

Embodiments of the present invention provide a power control method and apparatus, which can resolve a problem that, in a heterogeneous network scenario, power consumption is excessively large when a UE feeds back an HS-DPCCH, can reduce power consumption of the UE and reduce uplink interference of a micro cell and a macro cell.

The technical solutions adopted in the embodiments of the present invention are as follows:

According to a first aspect, a power control method is provided, including:

determining, according to a power offset parameter configured by a network side, a first power offset value used by a control channel corresponding to a first subframe, and determining a second power offset value used by a control channel corresponding to a second subframe;

feeding back the control channel corresponding to the first subframe to the network side by using the first power offset value; and feeding back the control channel corresponding to the second subframe to the network side by using the second power offset value.

In a first possible implementation manner, the power offset parameter includes:

a first power offset parameter and a second power offset parameter; or a third power offset value.

With reference to the first possible implementation manner, in a second possible implementation manner, the determining, according to a power offset parameter configured by a network side, a first power offset value used by a control channel corresponding to a first subframe, and determining a second power offset value used by a control channel corresponding to a second subframe includes: determining the first power offset value according to the first power offset parameter, and determining the second power offset value according to the second power offset parameter.

Optionally, when the power offset parameter includes only the third power offset value, before the determining a first power offset value used by a control channel corresponding to a first subframe, the method further includes: receiving notification signaling sent by the network side, where the notification signaling carries a power offset adjustment parameter, and the power offset adjustment parameter includes a fourth power offset value or a power adjustment value; or obtaining a fourth power offset value by calculation according to the first subframe or obtaining, by calculation, a power adjustment value relative to the third power offset value.

With reference to the second possible implementation manner, in a third possible implementation manner, when the control channel corresponding to the first subframe is fed back to the network side by using the first power offset value, a subframe of the control channel includes only feedback information of a micro Pico cell, and the feedback information includes a hybrid automatic repeat request-acknowledgment HARQ-ACK and a channel quality indicator CQI.

Further, the determining, according to a power offset parameter configured by a network side, a first power offset value used by a control channel corresponding to a first subframe, and determining a second power offset value used by a control channel corresponding to a second subframe includes: determining the third power offset value as the second power offset value, and determining the fourth power offset value as the first power offset value; or determining a difference between the third power offset value and the power adjustment value as the first power offset value.

The notification signaling is radio resource control RRC signaling or physical layer signaling.

With reference to the first aspect, the first possible implementation manner of the first aspect, the second possible implementation manner of the first aspect, and the third possible implementation manner of the first aspect, in a fourth possible implementation manner, the first subframe is a subframe with a limitation on signal transmission or transmit power, and the second subframe is a subframe with no limitation on signal transmission or transmit power.

According to a second aspect, a power control apparatus is provided, including:

a determining unit, configured to: determine, according to a power offset parameter configured by a network side, a first power offset value used by a control channel corresponding to a first subframe, and determine a second power offset value used by a control channel corresponding to a second subframe; and a feedback unit, configured to feed back the control channel corresponding to the first subframe to the network side by using the first power offset value determined by the determining unit; and configured to feed back the control channel corresponding to the second subframe to the network side by using the second power offset value determined by the determining unit.

In a first possible implementation manner, the power offset parameter includes:

a first power offset parameter and a second power offset parameter; or a third power offset value.

With reference to the first possible implementation manner, in a second possible implementation manner, the determining unit is specifically configured to: determine the first power offset value according to the first power offset parameter, and determine the second power offset value according to the second power offset parameter.

Further, the apparatus includes: a receiving unit, configured to receive notification signaling sent by the network side, where the notification signaling carries a power offset adjustment parameter, and the power offset adjustment parameter includes a fourth power offset value or a power adjustment value; or a calculating unit, configured to obtain a fourth power offset value by calculation according to the first subframe or obtain, by calculation, a power adjustment value relative to the third power offset value.

With reference to the second possible implementation manner, in a third possible implementation manner, when the feedback unit feeds back the control channel corresponding to the first subframe to the network side by using the first power offset value, a subframe of the control channel includes only feedback information of a micro Pico cell, and the feedback information includes a hybrid automatic repeat request-acknowledgment HARQ-ACK and a channel quality indicator CQI.

Further, the determining unit is specifically configured to: determine the third power offset value as the second power offset value, and determine the fourth power offset value as the first power offset value; or determine a difference between the third power offset value and the power adjustment value as the first power offset value.

According to a third aspect, a user equipment is provided, including:

a processor, configured to: determine, according to a power offset parameter configured by a network side, a first power offset value used by a control channel corresponding to a first subframe, and determine a second power offset value used by a control channel corresponding to a second subframe; and a transmitter, configured to feed back the control channel corresponding to the first subframe to the network side by using the first power offset value determined by the processor; and configured to feed back the control channel corresponding to the second subframe to the network side by using the second power offset value determined by the processor.

In a first possible implementation manner, the power offset parameter includes:

a first power offset parameter and a second power offset parameter; or a third power offset value.

With reference to the first possible implementation manner, in a second possible implementation manner, the processor is specifically configured to: determine the first power offset value according to the first power offset parameter, and determine the second power offset value according to the second power offset parameter.

Further, the user equipment includes: a receiver, configured to receive notification signaling sent by the network side, where the notification signaling carries a power offset adjustment parameter, and the power offset adjustment parameter includes a fourth power offset value or a power adjustment value; or the processor, further configured to obtain a fourth power offset value by calculation according to the first subframe or obtain, by calculation, a power adjustment value relative to the third power offset value.

With reference to the second possible implementation manner, in a third possible implementation manner, when the transmitter feeds back the control channel corresponding to the first subframe to the network side by using the first power offset value, a subframe of the control channel includes only feedback information of a micro Pico cell, and the feedback information includes a hybrid automatic repeat request-acknowledgment HARQ-ACK and a channel quality indicator CQI.

Further, the processor is specifically configured to: determine the third power offset value as the second power offset value, and determine the fourth power offset value as the first power offset value; or determine a difference between the third power offset value and the power adjustment value as the first power offset value.

Compared with the prior art, in the embodiments of the present invention, according to a power offset parameter configured by a network side, a first power offset value used by a control channel corresponding to a first subframe can be determined, and a second power offset value used by a control channel corresponding to a second subframe is determined; the control channel corresponding to the first subframe is fed back to the network side by using the first power offset value; the control channel corresponding to the second subframe is fed back to the network side by using the second power offset value. For a UE working in multiflow transmission, different power offset values are used for HS-DPCCHs corresponding to different subframes, which resolves a problem that in a heterogeneous network scenario, more power is consumed when the UE feeds back an HS-DPCCH corresponding to an ABS subframe due to a relatively large power offset of the ABS subframe, and a problem of communication signal interference due to the relatively large power offset of the ABS subframe, thereby decreasing power consumption when the UE feeds back the HS-DPCCH and decreasing interference between uplink signals.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To make the advantages of the technical solutions of the present invention clearer, the following describes the present invention in detail with reference to the accompanying drawings and embodiments.

Embodiment 1

Figure 1:
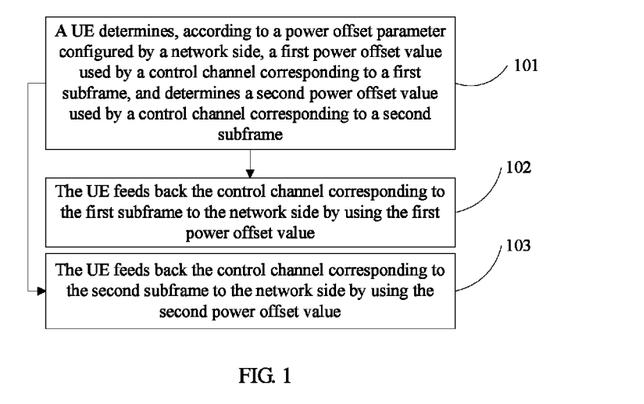
FIG. 1 is a flowchart of a method according to Embodiment 1 of the present invention.

This embodiment provides a power control method, where a UE works in a multiflow transmission mode and simultaneously performs data transmission with a macro cell and a micro cell. As shown in FIG. 1, the method includes:

101: The UE determines, according to a power offset parameter configured by a network side, a first power offset value used by a control channel corresponding to a first subframe, and determines a second power offset value used by a control channel corresponding to a second subframe.

When the network side configures the power offset parameter for the UE, a base station corresponding to a macro cell may perform configuration for the UE, or a base station corresponding to a micro cell may perform configuration for the UE, or two base stations perform joint configuration for the UE.

For example, the power offset parameter may include: a first power offset parameter and a second power offset parameter; or a third power offset value.

Optionally, when the power offset parameter includes the first power offset parameter and the second power offset parameter, the first power offset value is determined according to the first power offset parameter, and the second power offset value is determined according to the second power offset parameter. When the control channel corresponding to the first subframe is fed back to the network side by using the first power offset value, a subframe of the control channel includes only feedback information of a micro Pico cell, and the feedback information includes an HARQ (Hybrid Automatic Requestor, hybrid automatic repeat)-ACK and a CQI (Channel Quality Indicator, channel quality indicator).

Optionally, when the power offset parameter includes the third power offset value, before the determining a first power offset value used by a control channel corresponding to a first subframe, the method further includes: receiving notification signaling sent by the network side, where the notification signaling carries a power offset adjustment parameter, and the power offset adjustment parameter includes a fourth power offset value or a power adjustment value; or the UE obtains, by calculation according to a type of the first subframe, a fourth power offset value or a power adjustment value relative to the third power offset value.

Specifically, the determining, according to a power offset parameter configured by a network side, a first power offset value used by a control channel corresponding to a first subframe, and determining a second power offset value used by a control channel corresponding to a second subframe includes: determining the third power offset value as the second power offset value, and determining the fourth power offset value as the first power offset value; or determining a difference between the third power offset value and the power adjustment value as the first power offset value.

The notification signaling is RRC (Radio Resource Control, radio resource control) signaling or physical layer signaling.

102: The UE feeds back the control channel corresponding to the first subframe to the network side by using the first power offset value.

103: The UE feeds back the control channel corresponding to the second subframe to the network side by using the second power offset value.

It should be noted that the first subframe described in the embodiment is a subframe with a limitation on signal transmission or transmit power, for example, an ABS subframe, and the second subframe is a subframe with no limitation on signal transmission or transmit power, for example, a non-ABS subframe.

Compared with the prior art, in this embodiment of the present invention, according to a power offset parameter configured by a network side, a first power offset value used by a control channel corresponding to a first subframe can be determined, and a second power offset value used by a control channel corresponding to a second subframe is determined; the control channel corresponding to the first subframe is fed back to the network side by using the first power offset value; the control channel corresponding to the second subframe is fed back to the network side by using the second power offset value. For a UE working in multiflow transmission, different power offset values are used for HS-DPCCHs corresponding to different subframes, which resolves a problem that in a heterogeneous network scenario, more power is consumed when the UE feeds back an HS-DPCCH corresponding to an ABS subframe due to a relatively large power offset of the ABS subframe, and a problem of communication signal interference due to the relatively large power offset of the ABS subframe, thereby decreasing power consumption when the UE feeds back the HS-DPCCH and decreasing interference between uplink signals.

Embodiment 2

Figure 2:
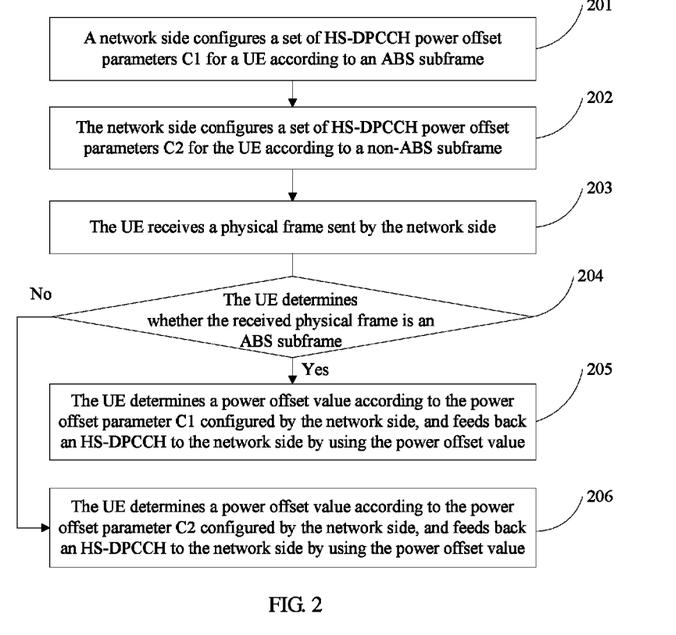
FIG. 2 is a flowchart of a method according to Embodiment 2 of the present invention.

This embodiment provides a power control method, where a UE woks in a MultiFlow (multiflow) transmission mode, and the UE is in a Single-Frequency Dual-Cell SF-CD, where a first subframe is an ABS subframe, and a second subframe is a non-ABS subframe. As shown in FIG. 2, the method includes:

201: A network side configures a set of HS-DPCCH power offset parameters C1 for the UE according to an ABS subframe.

202: The network side configures a set of HS-DPCCH power offset parameters C2 for the UE according to a non-ABS subframe.

It should be noted that there is no strict sequence between step 201 and step 202, and the two steps may also be executed simultaneously.

203: A UE receives a physical frame sent by the network side.

The physical frame may include an ABS subframe and a non-ABS subframe, where the ABS subframe is sent by a macro cell, and is used to reduce interference to a subframe that is sent by a micro cell at the same time. For example, a Pattern of the ABS subframe may be [100000100000100000100000100000].

204: The UE determines whether the received physical frame is an ABS subframe; if it is an ABS subframe, step 205 is executed; if it is a non-ABS subframe, step 206 is executed.

205: The UE determines a power offset value according to the power offset parameter C1 configured by the network side, and feeds back an HS-DPCCH to the network side by using the power offset value.

Optionally, because the ABS subframe is sent by the macro cell to reduce communication interference to the micro cell, the HS-DPCCH fed back by the UE for the ABS subframe is actually of no help to the macro cell. Therefore, when the UE feeds back the HS-DPCCH (which mainly includes a CQI and HARQ-ACK) for the ABS subframe, only information of the micro cell may be carried in the HS-DPCCH.

206: The UE determines a power offset value according to the power offset parameter C2 configured by the network side, and feeds back an HS-DPCCH to the network side by using the power offset value.

It should be noted that the UE is in a heterogeneous network scenario in which two communication networks, namely, a macro network and a micro network, are included, the UE is located within coverage of both the micro cell and the macro cell, and performs multiflow transmission with the two cells, and the UE feeds back the HS-DPCCH to the two cells by means of joint feedback. After receiving a joint feedback from the UE, the macro cell and the micro cell need to independently obtain respective feedback information by parsing, and perform scheduling on the UE according to the feedback information.

Compared with the prior art, in this embodiment of the present invention, a network side configures a set of HS-DPCCH power offset parameters C1 for a UE according to an ABS subframe; the network side configures a set of HS-DPCCH power offset parameters C2 for the UE according to a non-ABS subframe; the UE receives a physical frame sent by the network side; the UE determines whether the received physical frame is an ABS subframe, if it is an ABS subframe, the UE determines a power offset value according to the power offset parameter C1 configured by the network side, and feeds back an HS-DPCCH to the network side by using the power offset value, and if it is a non-ABS subframe, the UE determines a power offset value according to the power offset parameter C2 configured by the network side, and feeds back an HS-DPCCH to the network side by using the power offset value. For a UE working in multiflow transmission, different power offset values are used for HS-DPCCHs corresponding to the ABS subframe and the non-ABS subframe, which resolves a problem that in a heterogeneous network scenario, more power is consumed when the UE feeds back the HS-DPCCH corresponding to the ABS subframe due to a relatively large power offset of the ABS subframe, and a problem of communication signal interference due to the relatively large power offset of the ABS subframe, thereby decreasing power consumption when the UE feeds back the HS-DPCCH and decreasing interference between uplink signals.

Embodiment 3

Figure 3:
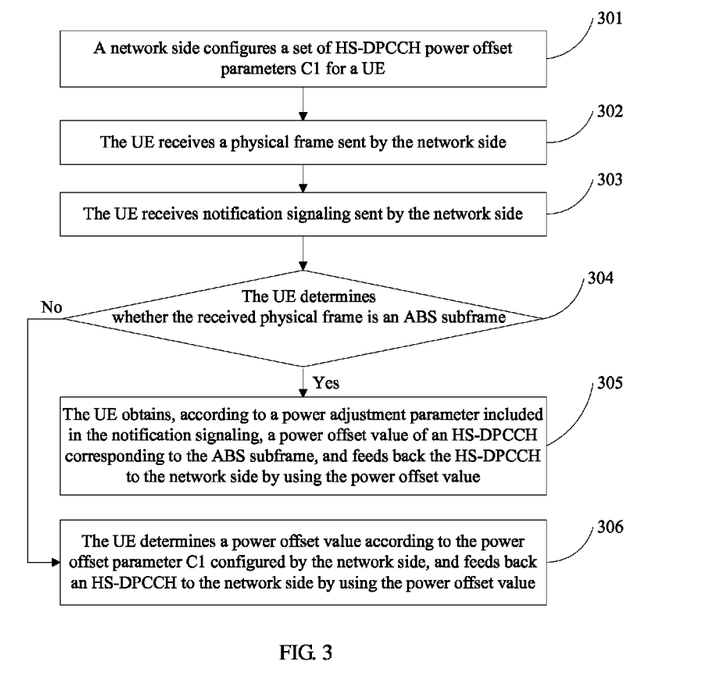
FIG. 3 is a flowchart of a method according to Embodiment 3 of the present invention.

This embodiment provides a power control method, where a UE woks in a MultiFlow (multiflow) transmission mode, and the UE is in a Single-Frequency Dual-Cell SF-CD, where a first subframe is an ABS subframe, and a second subframe is a non-ABS subframe. As shown in FIG. 3, the method includes:

301: A network side configures a set of HS-DPCCH power offset parameters C1 for the UE.

302: The UE receives a physical frame sent by the network side.

The physical frame may include an ABS subframe and a non-ABS subframe, where the ABS subframe is sent by a macro cell, and is used to reduce interference to a subframe that is sent by a micro cell at the same time. For example, a Pattern of the ABS subframe may be [100000100000100000100000100000].

303: The UE receives notification signaling sent by the network side.

The notification signaling includes a power adjustment parameter, where the power adjustment parameter is used by the UE to determine a power offset value of an HS-DPCCH corresponding to the ABS subframe.

Optionally, the notification signaling is RRC signaling or physical layer signaling, where the physical layer signaling includes an HS-SCCH (Shared Control Channel for HS-DSCH, shared control channel) command, 304: The UE determines whether the received physical frame is an ABS subframe; if it is an ABS subframe, step 305 is executed; if it is a non-ABS subframe, step 306 is executed.

305: The UE obtains, according to a power adjustment parameter included in the notification signaling, a power offset value of an HS-DPCCH corresponding to the ABS subframe, and feeds back the HS-DPCCH to the network side by using the power offset value.

For example, the notification signaling may directly include the power offset value of the HS-DPCCH corresponding to the ABS subframe, or include a relative power offset value, and the power offset value of the HS-DPCCH corresponding to the ABS subframe is determined according to a power offset value corresponding to the power offset parameter C1 and the relative power offset value, for example, Power offset value of HS-DPCCH corresponding to ABS subframe=Power offset value corresponding to power offset parameter C1−Relative power offset value.

The power offset value of the HS-DPCCH corresponding to the ABS subframe is far less than the power offset value corresponding to the power offset parameter C1.

Optionally, the UE may further obtain by calculation a fourth power offset value or a power adjustment value relative to a third power offset value.

306: The UE determines a power offset value according to the power offset parameter C1 configured by the network side, and feeds back an HS-DPCCH to the network side by using the power offset value.

It should be noted that the UE is in a heterogeneous network scenario in which two communication networks, namely, a macro network and a micro network, are included, the UE is located within coverage of both the micro cell and the macro cell, and performs multiflow transmission with the two cells, and the UE feeds back the HA-DPCCH to the two cells by means of joint feedback. After receiving a joint feedback from the UE, the macro cell and the micro cell need to independently obtain respective feedback information by parsing, and perform scheduling on the UE according to the feedback information.

Compared with the prior art, in this embodiment of the present invention, a network side configures a set of HS-DPCCH power offset parameters C1 for a UE according to an ABS subframe; the UE receives a physical frame sent by the network side; the UE receives notification signaling sent by the network side; the UE determines whether the received physical frame is an ABS subframe, if it is an ABS subframe, the UE obtains, according to a power adjustment parameter included in the notification signaling, a power offset value of an HS-DPCCH corresponding to the ABS subframe, and feeds back the HS-DPCCH to the network side by using the power offset value, and if it is a non-ABS subframe, the UE determines a power offset value according to the power offset parameter C1 configured by the network side, and feeds back an HS-DPCCH to the network side by using the power offset value. For a UE working in multiflow transmission, different power offset values are used for HS-DPCCHs corresponding to the ABS subframe and the non-ABS subframe, which resolves a problem that in a heterogeneous network scenario, more power is consumed when the UE feeds back the HS-DPCCH corresponding to the ABS subframe due to a relatively large power offset of the ABS subframe, and a problem of communication signal interference due to the relatively large power offset of the ABS subframe, thereby decreasing power consumption when the UE feeds back the HS-DPCCH and decreasing interference between uplink signals.

Embodiment 4

Figure 4:
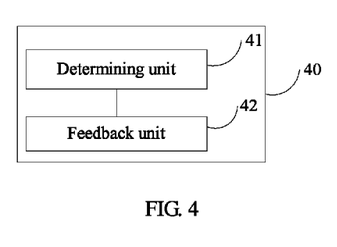
FIG. 4 and FIG. 5 are schematic structural diagrams of an apparatus according to Embodiment 4 of the present invention.

This embodiment provides a power control apparatus 40. As shown in FIG. 4, the apparatus 40 includes:

a determining unit 41, configured to: determine, according to a power offset parameter configured by a network side, a first power offset value used by a control channel corresponding to a first subframe, and determine a second power offset value used by a control channel corresponding to a second subframe; and a feedback unit 42, configured to feed back the control channel corresponding to the first subframe to the network side by using the first power offset value determined by the determining unit 41; and configured to feed back the control channel corresponding to the second subframe to the network side by using the second power offset value determined by the determining unit 41.

The power offset parameter includes: a first power offset parameter and a second power offset parameter; or a third power offset value.

Specifically, the determining unit 41 is configured to: determine the first power offset value according to the first power offset parameter, and determine the second power offset value according to the second power offset parameter.

When the feedback unit 42 feeds back the control channel corresponding to the first subframe to the network side by using the first power offset value, a subframe of the control channel includes only feedback information of a micro Pico cell, and the feedback information includes a hybrid automatic repeat request-acknowledgment HARQ-ACK and a channel quality indicator CQI.

Figure 5:
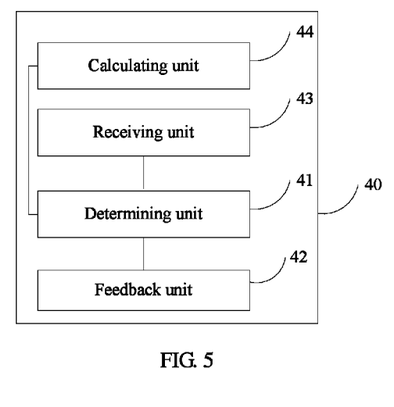

Further, as shown in FIG. 5, the apparatus 40 may further include:

a receiving unit 43, configured to receive notification signaling sent by the network side, where the notification signaling carries a power offset adjustment parameter, and the power offset adjustment parameter includes a fourth power offset value or a power adjustment value; or a calculating unit 44, configured to: obtain a fourth power offset value by calculation according to the first subframe or obtain, by calculation, a power adjustment value relative to the third power offset value.

Further, the determining unit 41 is specifically configured to:

determine the third power offset value as the second power offset value, and determine the fourth power offset value as the first power offset value; or determine a difference between the third power offset value and the power adjustment value as the first power offset value.

The notification signaling is radio resource control RRC signaling or physical layer signaling.

The first subframe is a subframe with a limitation on signal transmission or transmit power, and the second subframe is a subframe with no limitation on signal transmission or transmit power.

Compared with the prior art, in this embodiment of the present invention, according to a power offset parameter configured by a network side, a first power offset value used by a control channel corresponding to a first subframe can be determined, and a second power offset value used by a control channel corresponding to a second subframe is determined; the control channel corresponding to the first subframe is fed back to the network side by using the first power offset value; the control channel corresponding to the second subframe is fed back to the network side by using the second power offset value. For a UE working in multiflow transmission, different power offset values are used for HS-DPCCHs corresponding to different subframes, which resolves a problem that in a heterogeneous network scenario, more power is consumed when the UE feeds back an HS-DPCCH corresponding to an ABS subframe due to a relatively large power offset of the ABS subframe, and a problem of communication signal interference due to the relatively large power offset of the ABS subframe, thereby decreasing power consumption when the UE feeds back the HS-DPCCH and decreasing interference between uplink signals.

Embodiment 5

Figure 6:
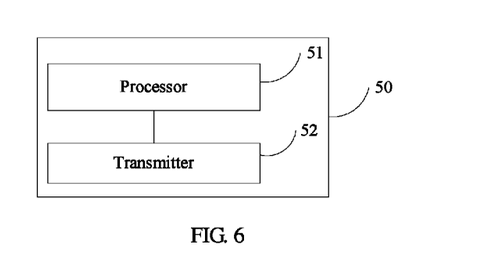
FIG. 6 and FIG. 7 are schematic structural diagrams of a user equipment according to Embodiment 5 of the present invention.

This embodiment provides a user equipment UE 50. As shown in FIG. 6, the user equipment 50 includes:

a processor 51, configured to: determine, according to a power offset parameter configured by a network side, a first power offset value used by a control channel corresponding to a first subframe, and determine a second power offset value used by a control channel corresponding to a second subframe; and a transmitter 52, configured to feed back the control channel corresponding to the first subframe to the network side by using the first power offset value determined by the processor 51; and configured to feed back the control channel corresponding to the second subframe to the network side by using the second power offset value determined by the processor 51.

The power offset parameter includes: a first power offset parameter and a second power offset parameter; or a third power offset value.

Specifically, the processor 51 is configured to: determine the first power offset value according to the first power offset parameter, and determine the second power offset value according to the second power offset parameter.

When the transmitter 52 feeds back the control channel corresponding to the first subframe to the network side by using the first power offset value, a subframe of the control channel includes only feedback information of a micro Pico cell, and the feedback information includes a hybrid automatic repeat request-acknowledgment HARQ-ACK and a channel quality indicator CQI.

Figure 7:
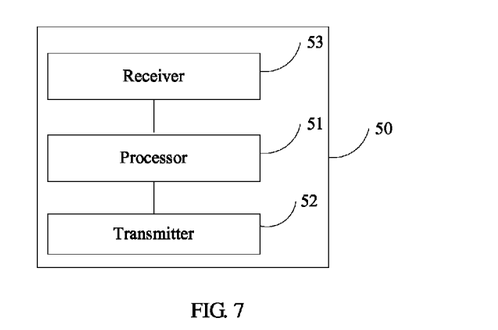

Further, as shown in FIG. 7, the user equipment 50 may include:

a receiver 53, configured to receive notification signaling sent by the network side, where the notification signaling carries a power offset adjustment parameter, and the power offset adjustment parameter includes a fourth power offset value or a power adjustment value; or the processor 51, further configured to obtain a fourth power offset value by calculation according to the first subframe or obtain, by calculation, a power adjustment value relative to the third power offset value.

Further, the processor 51 is further specifically configured to:

determine the third power offset value as the second power offset value, and determine the fourth power offset value as the first power offset value; or determine a difference between the third power offset value and the power adjustment value as the first power offset value.

The notification signaling is radio resource control RRC signaling or physical layer signaling.

The first subframe is a subframe with a limitation on signal transmission or transmit power, and the second subframe is a subframe with no limitation on signal transmission or transmit power.

Compared with the prior art, in this embodiment of the present invention, according to a power offset parameter configured by a network side, a first power offset value used by a control channel corresponding to a first subframe can be determined, and a second power offset value used by a control channel corresponding to a second subframe is determined; the control channel corresponding to the first subframe is fed back to the network side by using the first power offset value; the control channel corresponding to the second subframe is fed back to the network side by using the second power offset value. For a UE working in multiflow transmission, different power offset values are used for HS-DPCCHs corresponding to different subframes, which resolves a problem that in a heterogeneous network scenario, more power is consumed when the UE feeds back an HS-DPCCH corresponding to an ABS subframe due to a relatively large power offset of the ABS subframe, and a problem of communication signal interference due to the relatively large power offset of the ABS subframe, thereby decreasing power consumption when the UE feeds back the HS-DPCCH and decreasing interference between uplink signals.

The power control apparatus provided in the embodiments of the present invention may implement the method embodiments provided above; for specific function implementation, refer to the description in the method embodiments, and details are not described herein again. The power control method and apparatus provided in the embodiments of the present invention may be applicable to a multiflow transmission scenario in which a UE feeds back control information to a network side, to which it is not limited.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A power control method, comprising:

determining, according to a power offset parameter configured by a network side, a first power offset value used by a control channel corresponding to a first subframe, and determining a second power offset value used by a control channel corresponding to a second subframe;

feeding back the control channel corresponding to the first subframe to the network side by using the first power offset value; and feeding back the control channel corresponding to the second subframe to the network side by using the second power offset value, wherein when the power offset parameter comprises a third power offset value, and before the determining a first power offset value used by a control channel corresponding to a first subframe, the method further comprises:

receiving notification signaling sent by the network side, wherein the notification signaling carries a power offset adjustment parameter, and the power offset adjustment parameter comprises a fourth power offset value or a power adjustment value; or obtaining a fourth power offset value by calculation according to the first subframe or obtaining, by calculation, a power adjustment value relative to the third power offset value.

2. The method according to claim 1, wherein the determining, according to a power offset parameter configured by a network side, a first power offset value used by a control channel corresponding to a first subframe, and determining a second power offset value used by a control channel corresponding to a second subframe comprises:

determining the third power offset value as the second power offset value, and determining the fourth power offset value as the first power offset value; or determining a difference between the third power offset value and the power adjustment value as the first power offset value.

3. The method according to claim 1, wherein the notification signaling is radio resource control RRC signaling or physical layer signaling.

4. A user equipment in a multiflow transmission mode, comprising:
a processor, configured to: determine, according to a power offset parameter configured by a network side, a first power offset value used by a control channel corresponding to a first subframe, and determine a second power offset value used by a control channel corresponding to a second subframe; a transmitter, in communication with the processor and configured to feed back the control channel corresponding to the first subframe to the network side by using the first power offset value determined by the processor; and configured to feed back the control channel corresponding to the second subframe to the network side by using the second power offset value determined by the processor; and
a receiver, in communication with the processor and configured to receive notification signaling sent by the network side, wherein the notification signaling carries a power offset adjustment parameter.

5. The user equipment according to claim 4, wherein the power offset parameter comprises:
a first power offset parameter and a second power offset parameter; or
a third power offset value.

6. The user equipment according to claim 5, wherein the processor is configured to: determine the first power offset value according to the first power offset parameter, and determine the second power offset value according to the second power offset parameter.

7. The user equipment according to claim 6, wherein when the transmitter feeds back the control channel corresponding to the first subframe to the network side by using the first power offset value, a subframe of the control channel comprises only feedback information of a micro Pico cell, and the feedback information comprises a hybrid automatic repeat request-acknowledgment HARQ-ACK and a channel quality indicator CQI.

8. A user equipment, comprising:
a processor, configured to: determine, according to a power offset parameter configured by a network side, a first power offset value used by a control channel corresponding to a first subframe, and determine a second power offset value used by a control channel corresponding to a second subframe;
a transmitter, configured to feed back the control channel corresponding to the first subframe to the network side by using the first power offset value determined by the processor; and configured to feed back the control channel corresponding to the second subframe to the network side by using the second power offset value determined by the processor, wherein the power offset parameter comprises:
a first power offset parameter and a second power offset parameter; or
a third power offset value and
a receiver, configured to receive notification signaling sent by the network side, wherein the notification signaling carries a power offset adjustment parameter, and the power offset adjustment parameter comprises a fourth power offset value or a power adjustment value; or the processor, further configured to obtain a fourth power offset value by calculation according to the first subframe or obtain, by calculation, a power adjustment value relative to the third power offset value.

9. The user equipment according to claim 8, wherein the processor is further configured to:
determine the third power offset value as the second power offset value, and determine the fourth power offset value as the first power offset value; or determine a difference between the third power offset value and the power adjustment value as the first power offset value.

* * * * *